J. NEEDHAM.
GAS MIXER.
APPLICATION FILED AUG. 13, 1919.
1,355,998.
Patented Oct. 19, 1920.
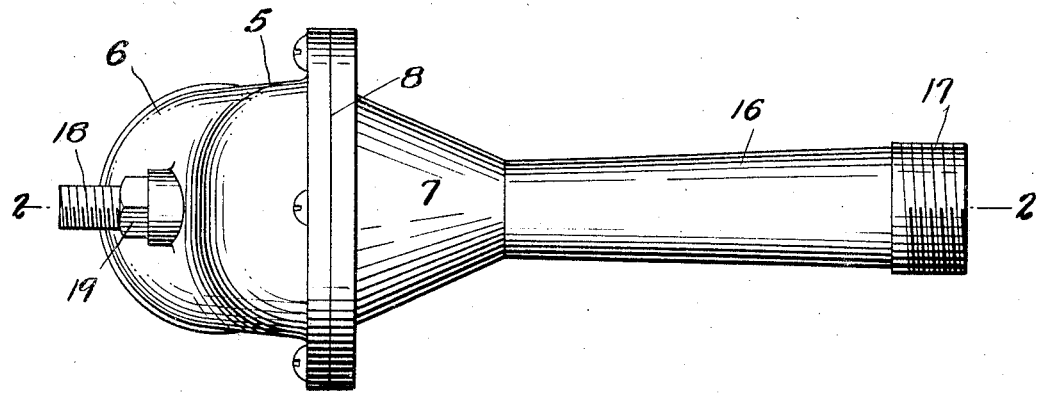
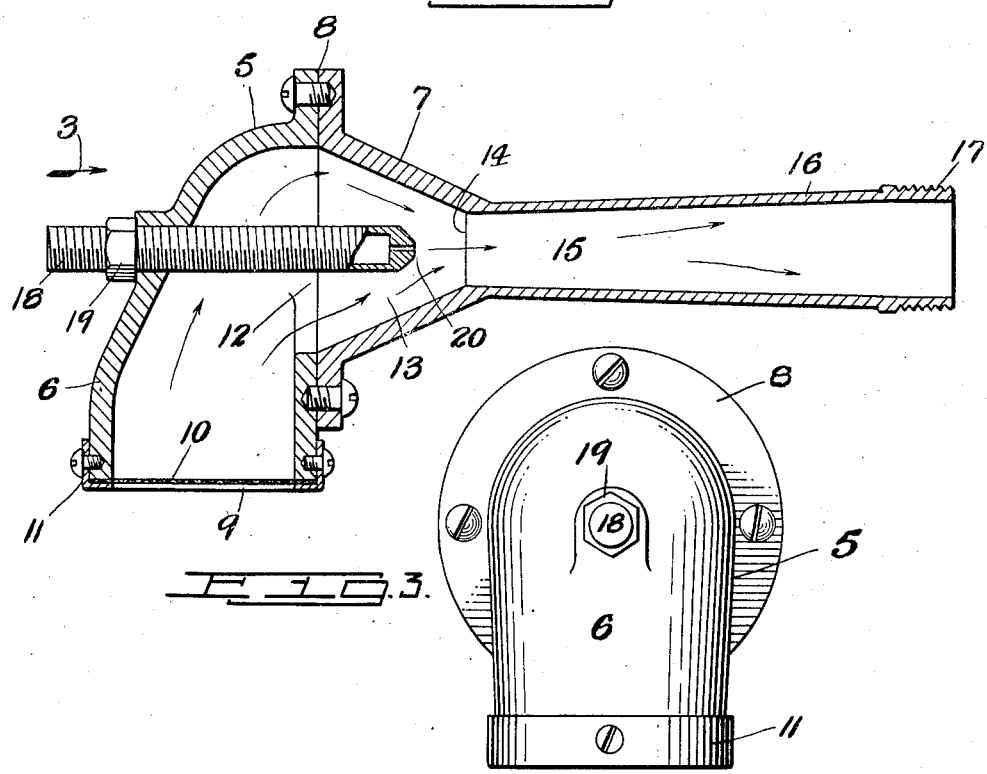
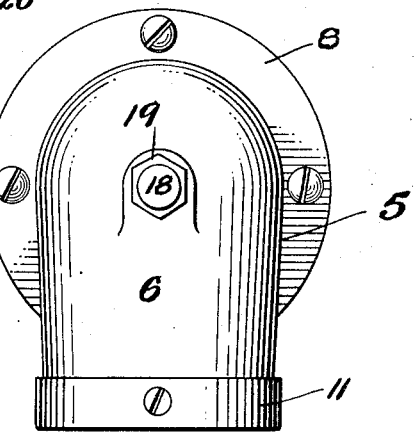
Inventor
Joseph Needham,
By his Attorneys Edgar Tate &Co.

UNITED STATES PATENT OFFICE.

JOSEPH NEEDHAM, OF NEW YORK, N. Y.

GAS-MIXER.

1,355,998.  Specification of Letters Patent.  Patented Oct. 19, 1920.

Application filed August 13, 1919. Serial No. 317,250.

*To all whom it may concern:*

Be it known that I, JOSEPH NEEDHAM, a citizen of the United States, and residing at New York, in the county of New York and State of New York, have invented certain new and useful Improvements in Gas-Mixers, of which the following is a specification, such as will enable those skilled in the art to which it appertains to make and use the same.

This invention relates to gas mixers for use in connection with fuel gas burners of the Bunsen type, and a sample of which is shown and described in U. S. Letters Patent granted to me July 25, 1916, No. 1,192,550; and the object of the invention described and claimed herein is to provide a gas mixer of the class referred to in which gaseous fuel under pressure is mixed with air in such manner as to obtain the most efficient combustion of the said mixer; and with this and other objects in view the invention consists in a device of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a plan view of a gas mixer device made according to my invention;

Fig. 2 a longitudinal section on the line 2—2 of Fig. 1; and,

Fig. 3 a back view of the device, or a view looking in the direction of the arrow 3 of Fig. 2.

In the practice of my invention I provide a mixer body or housing 5 composed of a back part 6 and a front part 7, said parts being detachably connected as shown at 8.

The back part 6 is approximately semi-conical in form and the larger end thereof is directed downwardly and opens downwardly as shown at 9 and, in the construction shown, is provided with a screen 10 held in place by an annular detachable cap 11.

The front part 7 is conical in form or tapered from the base thereof forwardly as clearly shown in Fig. 2, and said back and front parts are placed in communication by means of an opening 12 at the top of the back part, which communicates with the opening in the front part 7, and this opening in the front part 7 forms a mixing chamber 13 which is tapered forwardly and provided with a comparatively small discharge throat 14 which communicates with a supplemental mixing chamber 15 in a forwardly directed sleeve 16 with which the front part 7 of the mixer body is provided.

The sleeve 16 is also gradually enlarged from the conical member 7 with which it is connected forwardly and the mixing chamber 15 formed in said sleeve is correspondingly gradually enlarged, and the end of the sleeve 16 is threaded as shown at 17 to facilitate the connection of the mixer with a burner or burner appliance of any kind or class used for any purpose.

I also provide a fuel gas supply device 18 which, in the construction shown, consists of a threaded tube which is passed centrally through the back wall of the back part 6 of the mixer body and into and through the chamber in the top part of said back part of the mixer body and centrally through the front opening therein and into the mixing chamber 13 in the part 7 of the mixer body, and the tube 18 is provided with a set nut 19 whereby said tube is made forwardly and backwardly adjustable, and by means of which the position of the front end or nozzle 20 of said tube with reference to the throat 14 of the mixing chamber 13 may be adjusted to any desired extent at any time.

The operation of this device will be readily understood from the foregoing description when taken in connection with the accompanying drawing and the following statement thereof. In practice, the air enters through the opening 9 in the bottom of the mixer body and fuel gas under pressure is discharged into the mixer body or into the mixing chamber 13 through the fuel gas supply tube 18, and as the position of the fuel supply tube with reference to the throat 14 of the mixing chamber 13 may be adjusted to any desired extent, the mixing of the gas and air in the chamber 13 and in the chamber 15 may be regulated at all times, as will be readily understood, and this regulation will, of course, control the quality of the mixture by regulating the amount of air employed in connection with the amount of fuel gas discharged from the fuel gas supply. It will be understood, of course, that the correct operation of the device will depend upon the dimensions of the parts thereof, and especially of the conical member 7 and on the shape or form of the nozzle 20 of the gas fuel supply device and the comparative dimensions of said parts; and the chamber 15 and the sleeve 16, in addition, to serving as a supplemental mixing chamber also serves as an expansion chamber for the mixture as it passes therethrough, and this aids in supplying the mixture to the burners or burner appliances in the best possible form in order that the highest possible degree of combustion may be insured.

It will be understood that the screen 10 serves to strain the air passing therethrough and prevent foreign substances of any kind from entering the mixture, but this screen is not an absolutely essential element in my improvement, and while I have shown and described certain details of construction which I may employ for carrying my invention into effect, the said invention is not limited to these details, and changes therein and modifications thereof may be made, within the scope of the appended claims, without departing from the spirit of my invention or sacrificing its advantages.

Having fully described my invention, what I claim as new and desire to secure by Letters Patent, is:—

1. A gas mixing device of the class described comprising a main body portion, a supplemental body portion secured to the main body portion, said supplemental body portion being approximately elbow-shaped in form and provided with a downwardly directed air inlet opening, a screen for said air inlet opening, the main body portion being provided with a mixing chamber in communication with said air inlet opening, said mixing chamber having a tapered throat at its inner end, and a flaring discharge at its outer end and a fuel gas supply device adjustably mounted in the supplemental body portion and movable toward and from the throat of the main body portion to regulate the mixture of fuel and air passed through said throat into said discharge.

2. A device of the class described, comprising a body portion having an air inlet, said air inlet being provided with a reduced throat having a flaring discharge and a high pressure fuel supply device adjustable relatively to said throat to regulate the mixture of fuel and air passed through said throat into said discharge.

3. A gas mixing device of the class described comprising a body portion having an inlet opening and an outwardly flaring discharge provided at its inner end with a tapered throat and forming a mixing chamber, and a fuel gas supply tube adjustably mounted in the body portion and the inner end of which passes into said mixing chamber and adapted to be moved toward and from said throat.

4. A gas mixing device of the class described comprising a main body portion, a supplemental body portion secured to the main body portion, the main body portion being provided with a mixing chamber having a tapered throat and a flaring discharge, the supplemental body portion being provided with an air inlet, and a fuel gas supply device adjustably mounted in the supplemental body portion and passing centrally into said mixing chamber and movable toward and from said throat to control the entrainment of air through said throat.

In testimony that I claim the foregoing as my invention I have signed my name in presence of the subscribing witnesses this 11th day of August, 1919.

JOSEPH NEEDHAM.

Witnesses:
C. E. MULREANY,
H. E. THOMPSON.